US008635044B2

(12) United States Patent
Touzelbaev et al.

(10) Patent No.: US 8,635,044 B2
(45) Date of Patent: Jan. 21, 2014

(54) TRANSIENT THERMAL MODELING OF MULTISOURCE POWER DEVICES

(75) Inventors: Maxat Touzelbaev, San Jose, CA (US); Yizhang Yang, Sunnyvale, CA (US); Gamal Refai-Ahmed, Markham (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 379 days.

(21) Appl. No.: 13/095,406

(22) Filed: Apr. 27, 2011

(65) Prior Publication Data

US 2012/0278029 A1 Nov. 1, 2012

(51) Int. Cl.
*G01K 13/00* (2006.01)

(52) U.S. Cl.
USPC .......................................................... 702/130

(58) Field of Classification Search
USPC .......................................................... 702/130
See application file for complete search history.

(56) References Cited

U.S. PATENT DOCUMENTS

| | | | |
|---|---|---|---|
| 7,447,318 B2 * | 11/2008 | Button et al. | 381/55 |
| 2005/0195919 A1 * | 9/2005 | Cova | 375/297 |
| 2009/0024347 A1 * | 1/2009 | Chandra et al. | 702/130 |

OTHER PUBLICATIONS

Szekely V. and Bien, Tran Van, 1988, "Fine structure of heat flow path in semiconductor devices: a measurement and identification method," Solid-State Electronics, vol. 31, No. 9, pp. 1363-1368.
Y. C. Gerstenmair and G. Wachutka, 2000, "Calculation of the temperature development in electronic systems by convolution integrals," Proc. 16th SEMITHERM, pp. 50-59.
D. Schweitzer, 2009, "A fast algorithm for thermal transient multisource simulation using interpolated Zth functions," IEEE Transactions on Components and Packaging Technologies, vol. 32, No. 2, pp. 478-483.

* cited by examiner

*Primary Examiner* — Bryan Bui
(74) *Attorney, Agent, or Firm* — Volpe and Koenig, P.C.

(57) ABSTRACT

Embodiments of systems and methods for improved measurement of transient thermal responses in electronic systems are described herein. Embodiments of the disclosure use the known thermal transfer function of an electronic system to generate an equivalent resistor-capacitor (RC) network having a dynamic response that is identical to a given power excitation as the actual electronic system would have to that power excitation. Using the analogy between thermal and electrical systems, a Foster RC network is constructed, comprising a plurality of RC stages in which resistors and capacitors are connected in parallel. Subsequently, the analog thermal RC network is converted into an infinite impulse response (IIR) digital filter, whose coefficients can be obtained the Z-transform of the analog thermal RC network. This IIR digital filter establishes the recursive relationship between temperature output at the current time step and measured power input at the previous time step. Using this IIR digital filter, temperature response subject to arbitrary time-dependent power can be calculated in very small amount of time compared with prior art methods.

17 Claims, 5 Drawing Sheets

TRANSIENT THERMAL MODELING OF MULTISOURCE POWER DEVICES

BACKGROUND OF THE INVENTION

1. Field of the Invention

The present invention relates in general to the field of data processing circuitry and, more specifically, to systems and methods for improving data processing circuit performance by providing improved dynamic monitoring management of thermal transients in integrated circuits.

2. Description of the Related Art

Modern integrated circuits have benefited from several decades of Moore's law. Many modern integrated circuits have more than a billion transistors. There are also has been a trend toward highly non-homogeneous, rapidly varying power densities in semiconductor devices, particularly in microprocessors. This has driven the need for improved methods to predict transient temperature responses of systems and devices with multiple heat sources.

While computational resources required for direct thermal simulation, e.g., using detailed finite element modeling (FEM), have historically been used, several methods implementing reduced-complexity models have recently been developed for detection of dynamic thermal responses electronic systems to provide a significant reduction in computing time. However, these approaches still consume considerable computational resources, thus inhibiting implementation of these techniques in real-time temperature prediction and dynamic power management applications.

In recent years, there has been increased interest in the application of dynamic thermal management (DTM), for example, through power regulation when operating temperatures exceed safety thresholds. In many integrated circuits, actual thermal sensors are located at predetermined locations on the integrated circuit. An alternative technique for thermal characterization is to measure a "thermal step-response function (often called the transient thermal impedance). Existing methods for implementing this technique, typically calculate the transient temperature of the systems, avoiding direct finite element numerical simulations. These techniques typically involve the use of thermal equivalent circuits, time-domain step response curves (transfer functions) and discrete convolution integrals.

In existing techniques for implementing thermal step-function measurement, calculation of the time-domain discrete convolution integral requires extensive numerical computational power, even when using discrete Fourier transforms or approximated interpolation of system transfer functions. This is due to the fact that the convolution operation yields the amount of overlap between power excitation and the system thermal transfer function, which is determined not only by values at the current time step, but also by the previous time steps. Therefore, these techniques require the storage of previous data points for current time thermal calculation, where the links of data depend on the characteristics of both the power profile and the thermal transfer function of the system. Thermal time constants of microcircuit components usually span over several orders of magnitude, e.g., from microseconds to minutes. Prior techniques for measuring the thermal response of circuit components having longer time constants make if difficult to respond to thermal changes in real time.

In view of the foregoing, it is apparent that there is a need for improved systems and methods for dynamic monitoring and management of thermal transients in data processing circuits. In particular, it would be desirable to provide a system and method for measuring thermal response of circuit components in a very short period of time.

BRIEF DESCRIPTION OF THE DRAWINGS

The present invention may be understood, and its numerous objects, features and advantages obtained, when the following detailed description is considered in conjunction with the following drawings, in which:

FIG. 4b is a graphical illustration of the derivative of the signal shown in FIG. 4a;

Figure 1:
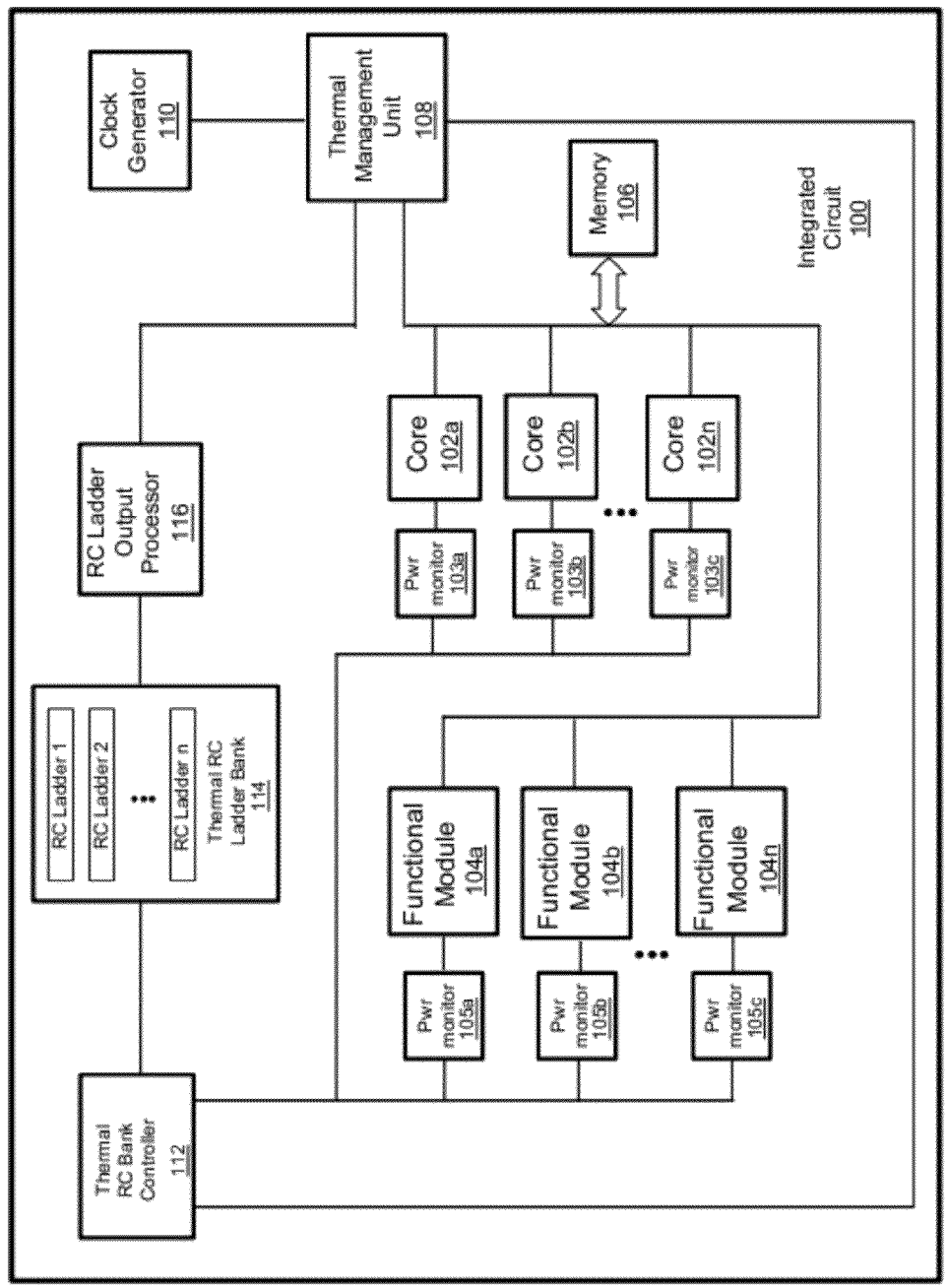
FIG. 1 is an illustration of an integrated circuit having functional components operable to implement embodiments of the present invention.

Where considered appropriate, reference numerals have been repeated among the drawings to represent corresponding or analogous elements.

SUMMARY OF EMBODIMENTS OF THE INVENTION

Embodiments of the disclosure comprise systems and methods for predicting temperature responses of electronic systems for optimized thermal and electronic performance. Embodiments of the disclosure use the known thermal transfer function of an electronic system to generate an equivalent resistor-capacitor (RC) network having a dynamic response that is identical (or very similar) to a given power excitation as the actual electronic system would have to that power excitation.

Using the analogy between thermal and electrical systems, a Foster RC network is constructed, comprising a plurality of RC stages in which resistors and capacitors are connected in parallel. Subsequently, the analog thermal RC network is converted into an infinite impulse response (IIR) digital filter, whose coefficients can be obtained the Z-transform of the analog thermal RC network. This IIR digital filter establishes the recursive relationship between temperature output at the current time step and measured power input at the previous time step. Using this IIR digital filter, temperature response subject to arbitrary time-dependent power can be calculated in very small amount of time compared with prior art methods. If the system comprises a plurality of power inputs, the temperature response at a given point is simply the superposition of temperature responses from each individual input.

DETAILED DESCRIPTION

Embodiments of circuitry are described for systems and methods for transient thermal modeling of multisource power devices. Illustrative embodiments will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified drawings in order to avoid limiting or obscuring the present invention. Such descriptions and representations are used by those skilled in the art to describe and convey the substance of their work to others skilled in the art. Various illustrative embodiments of the present invention will now be described in detail with reference to the figures.

FIG. 1 is a block diagram illustration of an integrated circuit 100 comprising functional components operable to implement embodiments of the invention. The integrated circuit 100 comprises a plurality of cores, 102a, 102b, ..., 102n. It further comprises functional modules 104a, 104b, ..., 104n. The functional modules 104a, 104b, ..., 104n can be various modules typically found in an integrated circuit. For example the functional modules may include dedicated graphics processors, input-output multiplexers, etc. The dynamic thermal modeling techniques described herein can be implemented to predict the thermal response for virtually any of the cores or functional modules shown in the integrated circuit 100 of FIG. 1. In some embodiments of the invention, one of the cores, for example core 102a, can be used to execute code for processing algorithms to implement the systems and methods disclosed herein. In some embodiments, the executable code is stored in memory 106, while in other embodiments, it may be stored in firmware inside one of the cores 102a, 102b, ..., 102n.

To maintain predetermined temperature thresholds, the thermal management unit 108 is operable to monitor the real-time power consumption of a plurality of cores and functional modules and, when power consumption reaches a predetermined level, to issue control signal to cause one of the cores, e.g., core 102a to initiate execution of a dynamic thermal monitoring algorithm. The control signals issued by the thermal management and control unit 110 also contain codes identifying the specific cores or functional modules that are to be simulated. The power consumption of each of the cores is monitored by corresponding power monitors 103a, 103b, ..., 103n and the power consumption of the functional blocks 104a, 104b, ..., 104n are monitored by corresponding power monitors 105a, 105b, ..., 105n. The outputs of the respective power control monitors are provided to the thermal resistor-capacitor bank controller 112, which is operable to direct incoming signals to the appropriate RC ladder in the RC ladder corresponding to a particular core or functional block.

The respective RC ladders in the thermal RC ladder bank 114 each comprise specific combinations of resistors and capacitors that have been selected accurately predict the thermal response of a specific core or functional model to specific changes in power consumption levels. The specific resistor and capacitor values can be derived from actual testing or from simulations. Using techniques discussed in greater detail hereinbelow, the response of the respective RC ladder can be used to predict the thermal response of the core or functional module to the change in power consumption.

The response signal from the respective RC ladders are processed by the step impulse response processor 116, using techniques discussed in greater detail below to provide digital input data for a processor, e.g. core 102a. The processor 116 uses digital filtering techniques and data processing other processing techniques, discussed below, to generate output data corresponding to the real-time thermal response of the module or core being tested. The processor processes the data and generates a real-time thermal response output signal that may be used by the thermal management control unit 108 to issue predetermined control signals to maintain power consumption within predetermined levels. For example, the thermal management control unit may change the frequency of the clock generator 110. Alternatively, or in conjunction, the thermal management unit 108 may turn off or lower the clock speed of one or more of the cores 102a, b, ..., 102n or the functional blocks 105a, b, ..., 105n.

Figure 2:
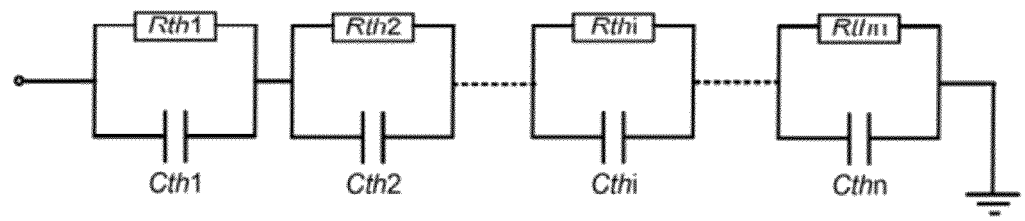
FIG. 2 is a resistor-capacitor ladder configured as a Foster network.

FIG. 2 is an illustration one of the RC ladders 1, 2, ..., n shown in the RC ladder bank 114 of FIG. 2. As discussed above, each of the resistors and capacitors have values that are selected to generate thermal response signals that correspond to specific cores or modules on the integrated circuit 100. The thermal impedance, $Z_{th}$, of an RC ladder shown in FIG. 2 is given by the following equation:

$$Z_{th}(t) = \sum_{i=1}^{n} R_{th_i}\left(1 - e^{-\frac{t}{R_{th_i} C_{th_i}}}\right)$$

where $R_{th}$=thermal resistance, and
$C_{th}$=thermal capacitance.

Figure 3:
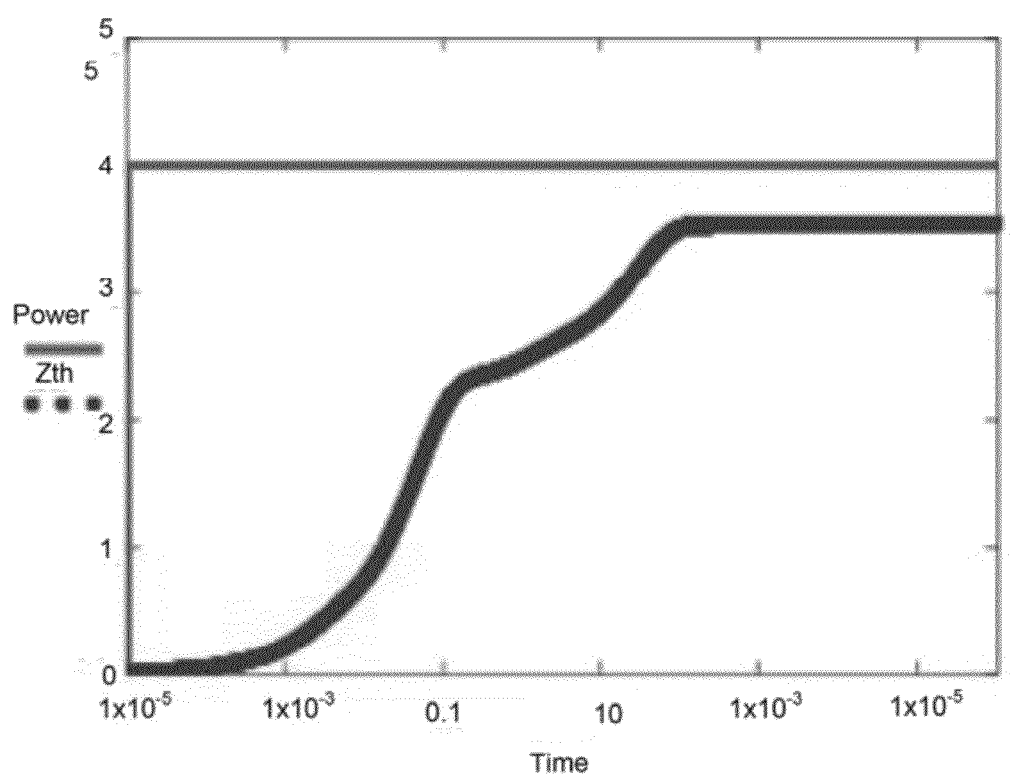
FIG. 3 is an illustration of the thermal response of a system to a step function impulse power signal.

FIG. 3 is a graphical representation of the change in thermal impedance of a representative system in response to a step function power excitation. The temperature response T(t) to an arbitrary power trace input P(t), with respect to ambient $T_0$, can be calculated using the following equation:

$$T(t) = T_0 + \int_0^t P(\tau) \cdot \dot{Z}_{th}(t - \tau) d\tau$$

where τ is the RC time constant.

Figure 4A:
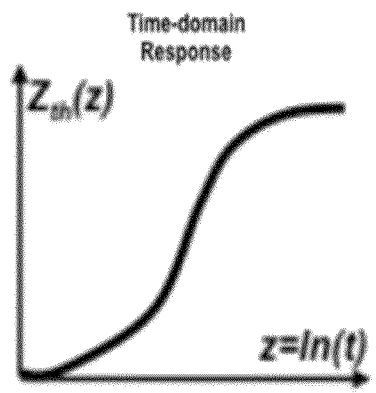
FIG. 4a is an illustration of the time domain thermal impedance response of the system to a step function impulse input signal.
Figure 4B:
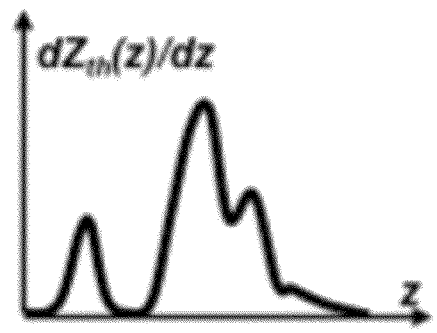
Figure 4C:
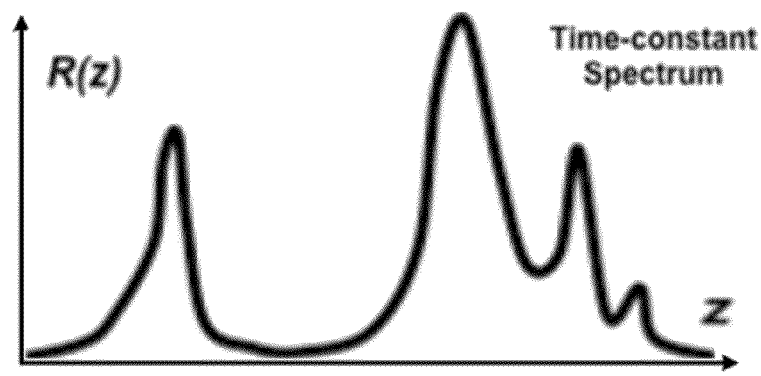
FIG. 4c is an illustration of the logarithmic time-constant distribution as a function of impedance.

FIGS. 4a-c provide graphical illustrations of methods for extracting values of R and C using a time constant spectrum R(t). FIG. 4a is a graphical illustration of the time-domain response of thermal impedance Zth(z) with respect to ln(t). FIG. 4b is a graphical illustration of the derivative of the curve show in FIG. 4a. The respective curves can be obtained using the following mathematical relationships.

$$Z_{th}(t) = \int_0^{+\infty} R(\tau) \cdot (1 - e^{-\frac{t}{\tau}}) d\tau$$

$$Z_{th}(z) = \int_{-\infty}^{+\infty} R(\zeta) \cdot (1 - e^{-e^{z-\zeta}}) d\zeta$$

$$z = \ln(t)$$

$$\frac{d}{dz} Z_{th}(z) = \int_{-\infty}^{+\infty} R(\zeta) \cdot e^{z-\zeta-e^{z-\zeta}}$$

$$d\zeta = R(z) \otimes e^{z-e^z}$$

Figure 5:
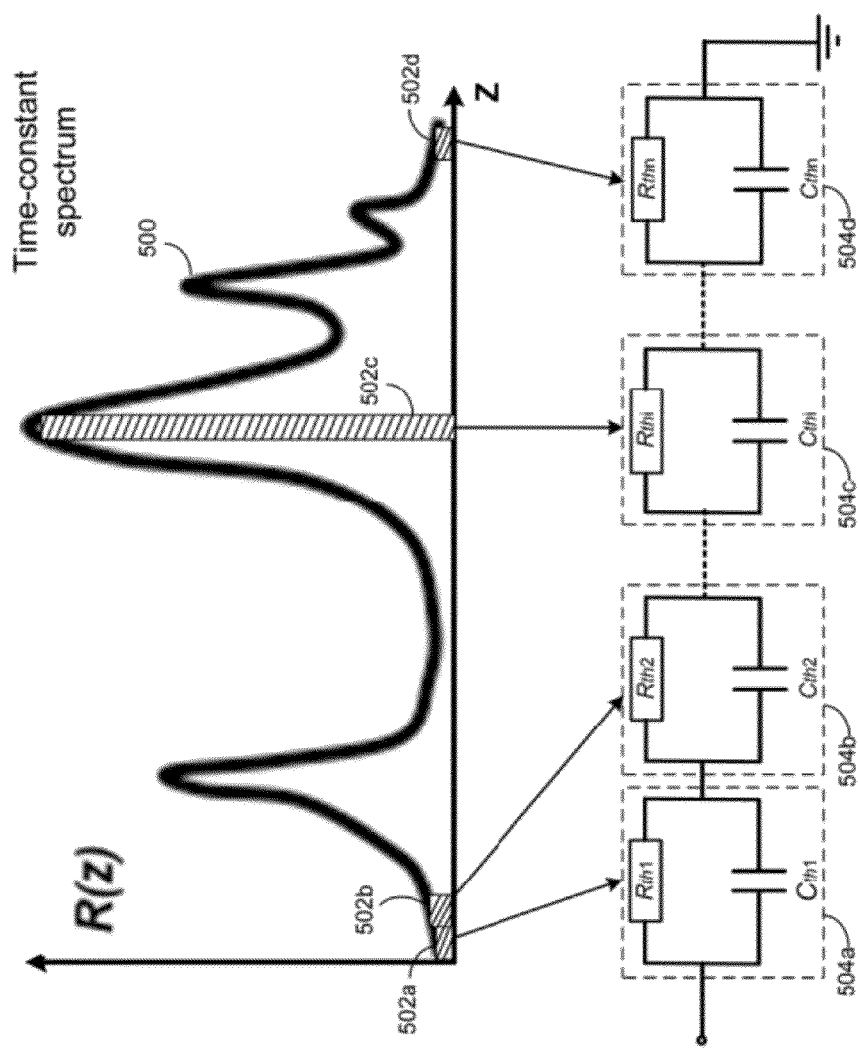
FIG. 5 is an illustration of a method of estimating a logarithmic time-constant distribution using a Foster RC ladder in accordance with embodiments of the invention.

FIG. 4c is an illustration of the thermal resistance as a function of impedance (R(z)). Referring to FIG. 5, it can be seen how the various RC blocks in the RC ladders are used to obtain data samples that can be use to generate a digital representation of the time-constant spectrum shown in FIG. 4c. In response to a power input signal, each of the various RC combinations is used to generate an output corresponding to a predetermined portion of the mathematical integral of the area under curve 500. For example, the first and portions 502a and 502b correspond to first and second RC pairs 504a and 504b, respectively. Likewise the "ith" and "nth" portions correspond to the "ith" and "nth" RC pairs 504c and 504d. The set of the RC combinations shown in FIG. 5 can be used to generate data providing an instantaneous digital representation of the time-spectrum constant curve for further processing to generate a real time representation of the thermal response of the module under test.

Those of skill in the art will understand that the RC pairs shown in FIG. 5 are analogous to an analog filter. Conversion from analog to digital filtering can be accomplished using the following relationship:

$$y(n) = \sum_{j=0}^{M} b_j \cdot x(n-j) - \sum_{i=0}^{N} a_i \cdot y(n-i)$$

x(n): input signal at time instant n
y(n): output signal at time instant n
$a_i$, i=0, 1 . . . N: feed-backward coefficients
$b_j$, j=0, 1 . . . M: feed-forward coefficients Those of skill in the art will recognize that the response of an infinite impulse response (IIR) filter "($a_i \neq 0$) output" is a function of both inputs and outputs at a present time and a previous time period. However, the response of a finite impulse response filter "($a_i=0$)" output is a function of only input at current and previous time instants. Therefore, the response characteristics of the IIR filter make well suited to implementations of embodiments of the present disclosure.

In a continuous frequency-domain, the complex impedance of the Foster thermal RC ladder network is:

$$H_{th}(s) = \sum_{i=1}^{K} \frac{R_{th_i}}{1+s \cdot \tau_i}; \tau_i = R_{th_i} C_{th_i}$$

Using the bilinear transformation:

$$s = \frac{2}{T_s} \frac{z-1}{z+1}$$

Where Ts is the sampling interval.

In discrete frequency-domain (z-domain), the transfer function of the Foster thermal RC ladder network:

$$H_{th}(z) = \frac{T(z)}{P(z)} =$$

$$\sum_{i=1}^{K} H_{th_i}(z) = \sum_{i=1}^{K} \frac{R_{th_i}}{1 + \frac{2}{T_s}\frac{z-1}{z+1} \cdot \tau_i} = \sum_{i=1}^{K} \frac{R_{th_i}T_s(1+z^{-1})}{(T_s - 2\tau_i)z^{-1} + (T_s + 2\tau_i)}$$

Applying the inverse Z transform:

$$T(z) = H_{th}(z)P(z) = \sum_{i=1}^{K} H_{th_i}(z)P(z) = \sum_{i=1}^{K} T_i(z)$$

$$T(n) = \sum_{i=1}^{K} T_i(n) = \sum_{i=1}^{k} \frac{2\tau_i - T_s}{2\tau_i + T_s} T_i(n-1) + \frac{R_{th_i}T_s}{2\tau_i + T_s}[P(n) + P(n-1)]$$

where: T=temperature; P=power excitation; n=time instant, $T_s$=sampling interval.

Extending this formulation to arbitrary number of heat sources, using linear superposition:

$$T(n) = \sum_{j=1}^{N} \left[ \sum_{i=1}^{K(j)} T_{i,j}(n) \right]$$

Where N is the number of heat sources. The number of filter stages in general may differ from source to source as a tradeoff between the accuracy of approximation and calculation speed, depending on the location where temperature is calculated. Then all time-constants and associated resistances can be re-formulated with the second subscript, j, which enumerates the heat source.

Figure 6:
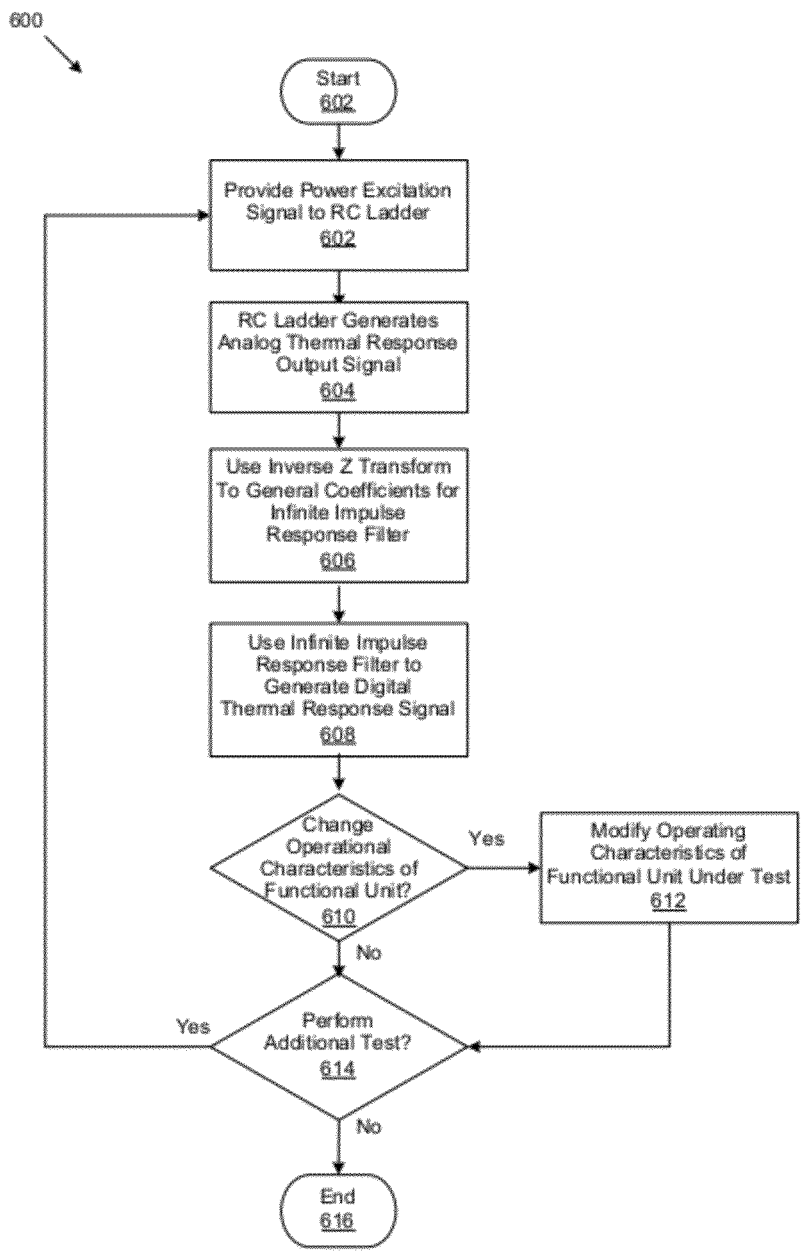
FIG. 6 is a flowchart representation of processing steps for implementing embodiments of the invention.

The processing of the output signals of the various RC ladders by the RC ladder processor 116 using the mathematical relationships shown above can be accomplished using data processing techniques known by those of skill in the art. FIG. 6 is a flowchart representation 600 of the processing steps for implementing embodiments of the invention as described herein. In step 600, processing is initiated using the processing techniques described herein. In step 602, a power excitation input signal is provided to an RC ladder network that comprises a plurality of RC pairs having resistive and capacitive values selected to simulate the thermal response characteristics of a predetermined functional unit of an integrated circuit. In step 604, the RC ladder generates an analog thermal response output signal in response to the power excitation input signal. In step 606, the output signal from the RC ladder is processed using a inverse Z transform to generate coefficients for an infinite impulse response filter. In step 608, the analog thermal response output signal is converted to a digital representation of the analog thermal response signal using an infinite impulse response filter. In step 610, the thermal response signal is analyzed by the thermal management unit 108 to determine whether the operational characteristics of the functional unit should be modifies. If it is determined that the operating characteristics should be modified, processing proceeds to step 612 wherein the functional unit's are modified accordingly. Processing then proceeds to step 614 to determine whether additional test should be formed on the functional unit. If there is a determination to perform additional testing, processing returns to step 602 and the aforementioned steps are repeated. If, however, the resulting of the processing in step 614 is to conduct no further tests, processing is ended in 616.

Embodiments of the invention disclosed herein can be fabricated using well known techniques that can be implemented with a data processing system using code (e.g., Verilog, Hardware Description Language (HDL), etc.) stored on a non-transitory computer usable medium. The code comprises data representations of the circuitry and components described herein that can be used to generate appropriate mask works for use in well known manufacturing systems to fabricate integrated circuits embodying aspects of the invention.

Although the described exemplary embodiments disclosed herein are directed to various examples of a system and method for managing hysteresis in data processing circuits, the present invention is not necessarily limited to the example embodiments. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of measuring transient thermal response of an electronic system, comprising:
   predicting a thermal response of the electronic system based on a thermal response from an RC network in response to a power excitation signal, said RC network having a thermal dynamic response corresponding to a thermal transfer function of a functional unit of said electronic system; and wherein
   said predicted thermal response of said electronic system is provided as an input to a thermal management system and wherein said thermal management system uses said predicted thermal response to change the operating characteristics of at least one circuit of said electronic system.

2. The method of claim 1, wherein said RC network comprises a Foster RC network.

3. The method of claim 1, wherein said thermal response output signal is processed using an infinite impulse response (IIR) filter.

4. The method of claim 3, wherein the coefficients of said IIR filter are obtained by processing said thermal response output signal using an inverse Z-transform.

5. The method of claim 1, wherein said circuit comprises a clock circuit.

6. The method of claim 1, wherein said circuit comprises a processor core.

7. A system for measuring transient thermal response of an electronic system, comprising:
   a resistor-capacitor (RC) network operable to receive a power excitation signal as an input and to generate a thermal response output signal therefrom, wherein said RC network has a thermal dynamic response corresponding to the known thermal transfer function of a predetermined functional unit of said electronic system; and
   processing logic operable to process said thermal output signal to generate data to predict thermal responses of said electronic system; and wherein
   said predicted thermal response of said electronic system is provided as an input to a thermal management system and wherein said thermal management system uses said predicted thermal response to change the operating characteristics of at least one circuit of said electronic system.

8. The system of claim 7, wherein said RC network comprises a Foster RC network.

9. The system of claim 7, wherein said thermal response output signal is processed using an infinite impulse response (IIR) filter.

10. The system of claim 9, wherein the coefficients of said IIR filter are obtained by processing said thermal response output signal using an inverse Z-transform.

11. The system of claim 7, wherein said circuit comprises a clock circuit.

12. The system of claim 7, wherein said circuit comprises a processor core.

13. A non-transitory computer readable medium comprising code stored therein, said code being executable by a processor to fabricate a system for measuring the transient thermal response of an electronic circuit, said system comprising:
   a resistor-capacitor (RC) network operable to receive a power excitation signal as an input and to generate a thermal response output signal therefrom, wherein said RC network has a thermal dynamic response corresponding to the known thermal transfer function of a predetermined functional unit of said electronic system; and
   processing logic operable to process said thermal output signal to generate data to predict thermal responses of said electronic system; and wherein
   said predicted thermal response of said electronic system is provided as an input to a thermal management system and wherein said thermal management system uses said predicted thermal response to change the operating characteristics of at least one circuit of said electronic system.

14. The non-transitory computer readable medium of claim 13, wherein said RC network comprises a Foster RC network.

15. The non-transitory computer readable medium of claim 13, wherein said thermal response output signal is processed using an infinite impulse response (IIR) filter.

16. The non-transitory computer readable medium of claim 15, wherein the coefficients of said IIR filter are obtained by processing said thermal response output signal using an inverse Z-transform.

17. The non-transitory computer readable medium of claim 13, wherein said circuit comprises a clock circuit.

* * * * *